W. M. KUHLMAN.
FAUCET CONNECTION.
APPLICATION FILED APR. 19, 1917.
1,288,042.
Patented Dec. 17, 1918.
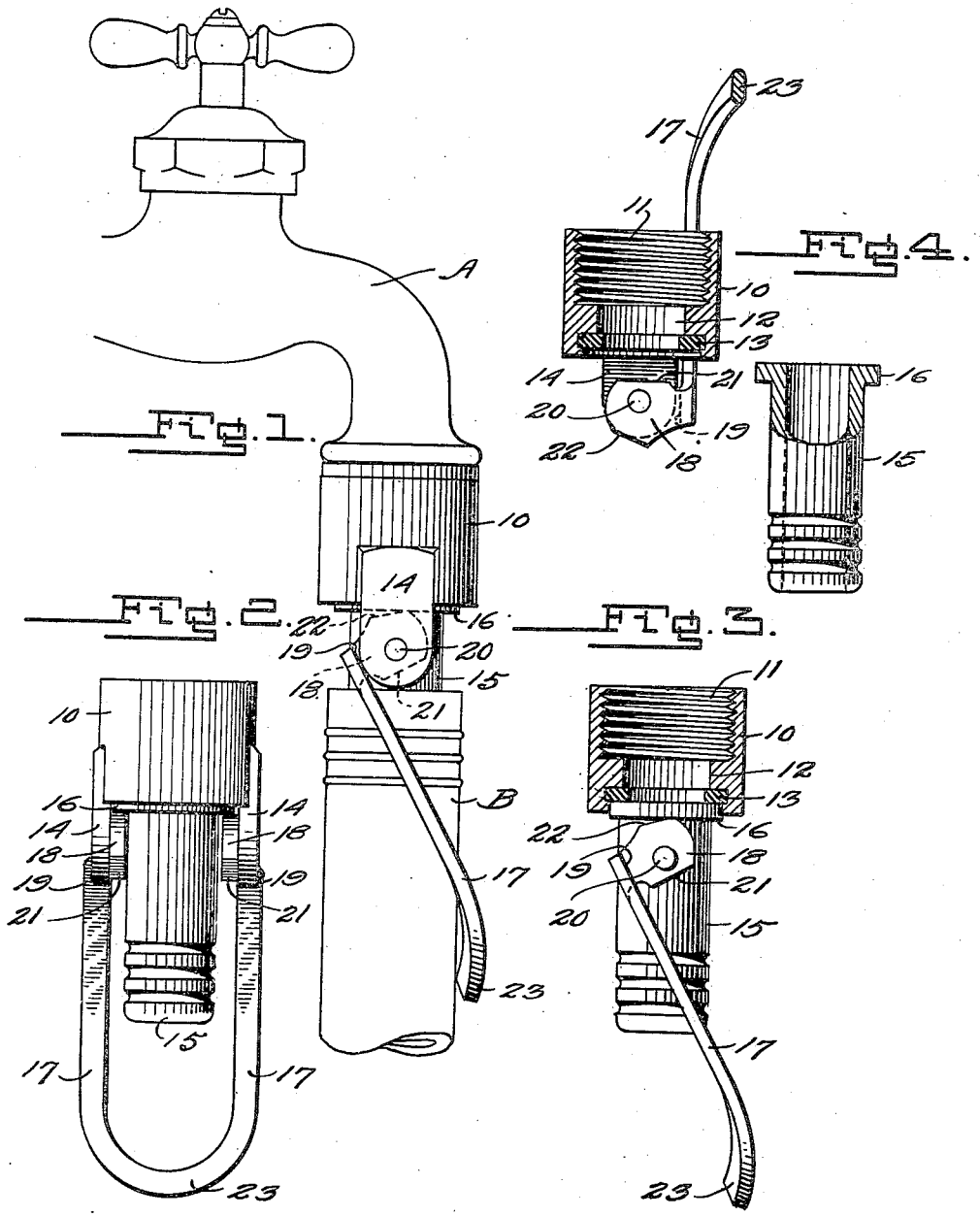
Inventor
Walter M. Kuhlman
By Lancaster and Allwine
his Attorneys

UNITED STATES PATENT OFFICE.

WALTER MARION KUHLMAN, OF CLEVELAND, OHIO.

FAUCET CONNECTION.

1,288,042.  Specification of Letters Patent.  Patented Dec. 17, 1918.

Application filed April 19, 1917. Serial No. 163,280.

*To all whom it may concern:*

Be it known that I, WALTER M. KUHLMAN, a citizen of the United States, and a resident of Cleveland, in the county of Cuyahoga and State of Ohio, have invented a certain new and useful Improvement in Faucet Connections of which the following is a specification.

The present invention relates to faucet connections, particularly to that type adapted to connect the end of a hose to a spigot or the like, and adapted for various other uses.

An object of the present invention is to provide a coupling embodying the features of simplicity, efficiency and low cost of manufacture.

The invention further aims at the provision of a coupling which comprises relatively few parts easily assembled and separated, and which, when secured together firmly binds the parts together and seals the joint therebetween.

The above, and various other objects and advantages of this invention will be in part described, and in part understood from the following detailed description of the present preferred embodiment, the same being illustrated in the accompanying drawing wherein:

Figure 1 is a side elevation of a hose coupling constructed according to the present invention, the same being attached to a faucet, and having one end of a hose secured thereto.

Fig. 2 is a front elevation of the coupling of this invention having the parts thereof secured together, the coupling being removed from the spigot and the end of the hose.

Fig. 3 is a side elevation of the coupling with the parts thereof secured together, one part of the coupling being shown in section.

Fig. 4 is a side elevation of the coupling, the parts being separated, and one of the parts being disclosed in section.

Referring to this drawing, wherein like parts are designated by similar characters of reference throughout the several views, A designates a faucet of the usual construction and B designates one end of a hose or pipe adapted to be secured to the faucet A.

The coupling comprises a member 10 open at opposite ends and provided at one end with internal screw threads 11 adapted for engagement over the threaded extremity of the faucet A, a pipe or other suitable device to which the member 10 may be secured. The opposite end of the member 10 is provided with an internal flange 12 spaced from the adjacent extremity of the member 10 to form an annular shoulder facing said end. The shoulder 12 forms the bottom of a socket in the end of the member 10, and a gasket 13 or other suitable packing member is seated upon the shoulder. The member 10 is provided at opposite sides of the socket with a pair of longitudinally extending and oppositely disposed ears 14 provided with transversely alining pivot openings therein.

An opposite member 15 in the form of a tubular shank, which may be secured in the end of the hose B as shown, is of relatively small external diameter and adapted to seat in the socket of the member 10. One end of the member 15 is provided with an outer peripheral flange 16 adapted to fit in the socket of the member 10 and to bear against the gasket 13. The flange 16 and the adjacent end of the member 15 may be introduced in the socket by moving the member 15 laterally between the ears 14.

The member 10 is provided with a bail 17 provided upon its free ends with a pair of cam heads 18, the latter being offset laterally at one side of the bail 17 and adapted to bear against the inner opposite faces of the ears 14. The cams 18 are preferably integrally formed and stamped from a blank with the bail 17, the cams 18 extending toward each other when in blank form, and being bent outwardly to one side of the bail as shown in the drawing. The ends of the bail 17 provide, at their junctures with the cams 18, external shoulders or stops 19 adapted to engage against the adjacent edges of the ears 14 when the bail 17 is swung over into its locking position. The cams 18 are provided with outwardly extending and axially alined pivot pins 20 adapted to engage in the apertures in the ears 14 for pivotally connecting the bail 17 to the member 10. The pivot pins 20 are eccentrically mounted upon the cams 18 and are adapted to advance the latter toward and from the shoulder 12 upon the swinging of the bail 17 in opposite directions.

The cams 18 are relatively thin, and are adapted to fit between the exterior wall of the member 15 and the inner sides of the ears 14, the peripheral bearing surfaces of the cams 18 being adapted to engage the flange 16 and urge the latter into the socket. As shown to advantage in Fig. 4, the cams 18 are provided upon their receding sides with flat edges 21 formed to space the cams 18 a considerable distance outwardly from the socket when the bail 17 is swung into releasing position, the cams 18, when in this position admitting of the lateral removal of the member 15 with its flange 16.

As shown to advantage in Figs. 1 and 3, the cams 18 are also provided at their highest points with flat retaining shoulders or edges 22 for binding engagement against the flange 16 when the bail 17 is swung into locking position for yieldingly holding the bail and the cams in such position. The bail 17 is given any suitable curvature at its outer end, and may be formed into a finger-receiving lip 23 which is adapted to bear against the faucet A when the bail is in releasing position to determine such position, and which is adapted for engagement with the end of the hose B when the bail is in locking position, to determine such position.

In use, the member 10 is adapted to be permanently attached to a pipe, a faucet or the like while the member 15 is adapted for securement to the end of a hose, a second pipe or the like which may be removably connected to the first pipe. To unite the coupling the bail 17 is first swung into the position shown in Fig. 4 to clear the space between the cams 18 and the adjacent end of the member 10. The member 15 with its flange 16 is now introduced laterally between the ears 14 and beneath the cams 18. The bail 17 is then swung downwardly into the position shown in Fig. 1, which movement turns the eccentrically mounted cams 18 and binds the latter against the flange 16, urging the flange and the adjacent end of the member 15 into the socket against the gasket 13. When the bail 17 is turned into its lowermost position, the shoulders 22 of the cams engage the flange 16 and are moved past the pivotal centers of the cams to yieldingly lock the bail in position. The members 10 and 15 are thus not only secured from accidental separation, but the member 15 is bound against the gasket 13 in the socket of the member 10 and the joint between the members is thus sealed.

It will be noted from this construction that the bail 17 carries upon its end the opposed cams which are pivotally and directly mounted upon the ears 14 which project from the member 10. The member 10 has a socket which centers the free end of the member 15 and which guides the flange 16 as the latter is urged into the socket and against the gasket. The coupling thus comprises relatively few parts, the same being so formed that they may be economically manufactured and readily assembled. The bail may be quickly sprung into or out of position with respect to the ears 17 by merely collapsing the free ends of the bail when the member 15 is removed from between the ears.

In the actual manufacture of these faucet connections, the bail 17 is stamped in a single piece from soft sheet steel about one-eighth inch in thickness. This soft sheet steel is the strongest material obtainable for the use as it may be case hardened to make the cams of the required hardness for resisting wear. Furthermore, the stamping of the bail from this material gives the necessary resiliency to the bail so that it may be easily sprung into and out of position without changing the form of the bail.

The other parts 10 and 15 of the faucet connections are also drawn from soft sheet steel and sheet brass, the structure being designed so that all of the parts may be stamped or drawn. The peculiar structure of bail 17, above described, is such that it supports the member 15 by its flange 16 when the coupling is released, the cams 18 supporting the member 15 and admitting of the lateral withdrawal of the member when it is desired to disconnect the parts.

It is of course understood that various changes and modifications may be made in the details of construction of the above specifically described hose coupling without departing from the spirit of the invention, and being restricted only by the scope of the following claim.

I claim:—

In a faucet connection, the combination of an open ended member having an internal shoulder near one end forming a socket and adapted to be secured to a faucet at its other end, said member having a pair of ears extending longitudinally from opposite sides of the said first end, a gasket seated on said shoulder, a second open ended member having a peripheral flange at one end adapted to seat in said socket against the gasket, and a bail stamped from a single piece of sheet metal with cam heads bent laterally from the inner edges at the free ends of the bail to provide external shoulders on the ends of the bail at the junctures of the cam heads therewith and said cam heads having outwardly extending and axially alined eccentric pivots, said bail being adapted to be compressed at its free ends and the pivots being adapted to be sprung into said ears with the cam heads against the inner walls thereof and in registry with said shoulder of the first member, the cams being adapted to lie closely against the opposite sides of the second member and support the ends of the bail in spaced relation to the opposite sides of the outer end of said second member for admitting the end of a hose thereabout, and to support the bail arms with their flat faces in position to receive pressure of the fingers for swinging the bail without injury to the fingers and with said external shoulders of the bail in position to engage the edges of the ears for limiting the movements of the bail.

WALTER MARION KUHLMAN.